(12) United States Patent
Umemoto et al.

(10) Patent No.: US 8,432,665 B2
(45) Date of Patent: Apr. 30, 2013

(54) SOLID ELECTROLYTIC CAPACITOR AND MANUFACTURING METHOD THEREOF

(75) Inventors: Takashi Umemoto, Hirakata (JP); Masaaki Nemoto, Ohta (JP); Hiroshi Nonoue, Hirakata (JP)

(73) Assignee: SANYO Electric, Ltd., Moriguchi-Shi (JP)

(*) Notice: Subject to any disclaimer, the term of this patent is extended or adjusted under 35 U.S.C. 154(b) by 201 days.

(21) Appl. No.: 12/934,193

(22) PCT Filed: Mar. 25, 2009

(86) PCT No.: PCT/JP2009/001322
§ 371 (c)(1),
(2), (4) Date: Sep. 23, 2010

(87) PCT Pub. No.: WO2009/119083
PCT Pub. Date: Oct. 1, 2009

(65) Prior Publication Data
US 2011/0019341 A1 Jan. 27, 2011

(30) Foreign Application Priority Data

Mar. 26, 2008 (JP) ................. 2008-082182

(51) Int. Cl.
*H01G 9/145* (2006.01)
(52) U.S. Cl.
USPC .......................... 361/528; 29/25.03
(58) Field of Classification Search .............. 361/523, 361/528–529, 532; 29/25.03
See application file for complete search history.

(56) References Cited

U.S. PATENT DOCUMENTS

| 4,907,131 | A | * | 3/1990 | Neal | ............... 361/534 |
|---|---|---|---|---|---|
| 5,007,149 | A | * | 4/1991 | Schnabel | ............... 29/25.03 |
| 5,469,326 | A | | 11/1995 | Kanetake | |
| 7,292,432 | B2 | * | 11/2007 | Furuzawa et al. | ............. 361/523 |
| 2004/0105197 | A1 | | 6/2004 | Kamigawa et al. | |

FOREIGN PATENT DOCUMENTS

| CN | 1549285 A | 11/2004 |
|---|---|---|
| JP | 58-190015 A | 11/1983 |
| JP | 01-087525 U | 6/1989 |
| JP | 04348512 A * | 12/1992 |
| JP | 05-136009 A | 6/1993 |
| JP | 06-132177 A | 5/1994 |
| JP | 08-148392 A | 6/1996 |
| JP | 2000-208367 A | 7/2000 |

* cited by examiner

*Primary Examiner* — Eric Thomas
(74) *Attorney, Agent, or Firm* — Marvin A. Motsenbocker; Mots Law, PLLC

(57) ABSTRACT

An object of the present invention is to provide a solid electrolytic capacitor having reduced leakage current and a manufacturing method thereof. The solid electrolytic capacitor of the present invention includes a capacitor element including: an anode 3 composed of a sintered body of metal particles; an anode lead 2 provided so that one end thereof is embedded in the anode 3; a dielectric layer 4 formed on the surface of the anode 3; an electrolyte layer 5 formed on the dielectric layer 4; and a cathode layer 6 formed on the electrolyte layer 5 so that an exposed face 50 of the electrolyte layer 5 exists around the anode lead 2, wherein an anode terminal 1 electrically connected to the other end of the anode lead 2 and a cathode terminal 7 electrically connected to the cathode layer 6 are attached to the capacitor element, and a first resin part 10 is provided to cover a part of the anode lead 2 extending from the exposed face 50 of the electrolyte layer 5 of the capacitor element to the anode terminal 1, and a second resin part 8 is provided to cover at least the above capacitor element and the first resin part 10.

7 Claims, 4 Drawing Sheets

(a)　　　　　　　　　(b)

(a)          (b)

(a)          (b)

SOLID ELECTROLYTIC CAPACITOR AND MANUFACTURING METHOD THEREOF

TECHNICAL FIELD

This invention relates to solid electrolytic capacitors and manufacturing methods thereof.

BACKGROUND ART

Solid electrolytic capacitors are conventionally known in which an anode made of a valve metal is anodized in an aqueous solution of phosphoric acid to form a metal oxide layer serving as a dielectric on the surface of the anode and manganese dioxide is used as an electrolyte layer. However, the small electrical conductivity of manganese dioxide presents a problem of increased equivalent series resistance (ESR).

Meanwhile, solid electrolytic capacitors are also known which are aimed at reducing the ESR by using a conductive polymer instead of manganese dioxide as an electrolyte layer.

Such a solid electrolytic capacitor using a conductive polymer as an electrolyte layer has the advantage of reduced ESR as compared to solid electrolytic capacitors using manganese dioxide as their electrolyte layers, but has the problem of increased leakage current. Particularly, for a solid electrolytic capacitor of such kind using niobium for the anode, its oxide layer serving as a dielectric layer is susceptible to heat and also sensitive to stress. Therefore, in the step of forming an outer package as by resin molding or like steps, an injection pressure of resin for resin molding is applied to the dielectric layer to damage the dielectric layer, thereby causing a problem of increasing the leakage current.

To address this, a technique has been developed for reducing the increase in leakage current by applying, before the formation of an outer package by resin molding, a sheet-shaped buffer formed of rubber, paper, fabric or the like only to a surface of the electronic component element facing the gate for molding to relax the resin injection pressure and thereby reduce the damage to the dielectric layer (see Patent Document 1). Patent Document 1: Published Japanese Patent Application No. H08-148392

DISCLOSURE OF THE INVENTION

However, even the technique disclosed in Patent Document 1 could not sufficiently reduce the increase in leakage current in the case of forming the outer package. The inventors' intensive studies in this respect have revealed that main factors of increase in leakage current in the outer package formation step are 1) stress through an anode lead and 2) stress through an electrolyte layer, both during formation of the outer package. The capacitor element and the anode terminal before the formation of the outer package are mechanically fixed only through the anode lead embedded at its one end in the anode body, and a part of the anode lead embedded in the anode body is not fully sintered. It can be therefore assumed that stress during formation of the outer package is transmitted through the anode lead to the interior of the anode body.

Furthermore, a part of the electrolyte layer located around the anode lead of the capacitor element is exposed, and the electrolyte layer has a higher hardness than the cathode layer and other neighboring layers. It can be therefore assumed that stress during formation of the outer package is transmitted through the electrolyte layer to damage the dielectric layer and its neighborhood.

For these reasons, it can be inferred that the technique disclosed in Patent Document 1 is effective to a certain extent in relaxing, one of the main factors of the increase in leakage current in the outer package formation step, the stress through the electrolyte layer, but does not reduce the stress through the anode lead.

The present invention is aimed at solving the above problem, and an object of the present invention is to provide a solid electrolytic capacitor having reduced leakage current and a manufacturing method thereof.

To solve the above problem, a solid electrolytic capacitor according to the present invention includes a capacitor element including: an anode composed of a sintered body of metal particles; an anode lead provided so that one end thereof is embedded in the anode; a dielectric layer formed on the surface of the anode; an electrolyte layer formed on the dielectric layer; and a cathode layer formed on the electrolyte layer so that an exposed face of the electrolyte layer exists around the anode lead, wherein an anode terminal electrically connected to the other end of the anode lead and a cathode terminal electrically connected to the cathode layer are attached to the capacitor element, and a first resin part is provided to cover a part of the anode lead extending from the exposed face of the electrolyte layer of the capacitor element to the anode terminal, and a second resin part is provided to cover at least the capacitor element and the first resin part.

Thus, the anode terminal and the anode body are connected not only by the anode lead but also by the first resin part. Therefore, the resin injection pressure during formation of the second resin part, i.e., the outer package, can be distributed to the first resin part and the anode lead, whereby the stress transmitted through the anode lead to the interior of the anode body can be relaxed. As a result, the increase in leakage current after the formation of the outer package can be reduced.

The first resin part may be provided to cover the entire exposed face of the electrolyte layer. Thus, the resin injection pressure during formation of the second resin part, i.e., the outer package, can be relaxed over the entire exposed part of the electrolyte layer by the first resin part, whereby the stress applied through the electrolyte layer to the anode body can be reduced. As a result, the increase in leakage current after the formation of the outer package can be further reduced.

A silicone resin may be used as the first resin part. This enhances the effect of relaxing the stress in the step of forming the outer package. Therefore, the increase in leakage current after the formation of the outer package can be further reduced.

The penetration of the silicone resin is preferably within the range from 30 to 200. Thus, the silicone resin used for the first resin part has such a suitable hardness range that during formation of the outer package, it can reduce the transmission of the resin injection pressure to the electrolyte layer and relax the stress transmitted through the anode lead to the interior of the anode body. Therefore, the increase in leakage current after the formation of the outer package can be further reduced.

A method for manufacturing a solid electrolytic capacitor includes the steps of: forming a capacitor element by forming an anode lead to embed one end thereof in an anode made of a sintered body of metal particles, forming a dielectric layer on the surface of the anode, forming an electrolyte layer on the dielectric layer and forming a cathode layer on the electrolyte layer to expose a part of the electrolyte layer located around the anode lead; electrically connecting the other end of the anode lead to an anode terminal; electrically connecting the cathode layer to a cathode terminal; after the step of electrically connecting the other end of the anode lead to the anode terminal, forming a first resin part to cover a part of the anode lead extending from the exposed face of the electrolyte layer of the capacitor element to the anode terminal; and forming a second resin part to cover at least the capacitor element and the first resin part.

Thus, the point at which the anode lead and the anode terminal are electrically connected can be certainly covered with the first resin part. Therefore, the increase in leakage current after the formation of the outer package can be more certainly reduced.

EFFECTS OF THE INVENTION

The present invention can provide a solid electrolytic capacitor having reduced leakage current and a manufacturing method thereof.

Figure 1:
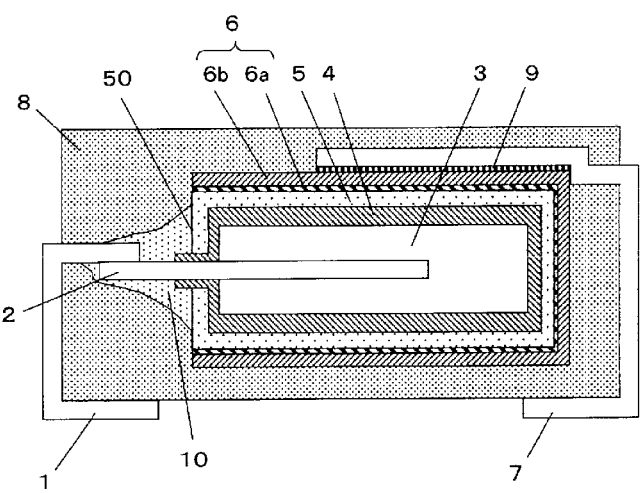
FIG. 1 is a cross-sectional view of a solid electrolytic capacitor according to an embodiment of the present invention.

| LIST OF REFERENCE NUMERALS | |
|---|---|
| 1 | anode terminal |
| 2 | anode lead |
| 3 | anode body |
| 4 | dielectric layer |
| 5 | electrolyte layer |
| 6 | cathode layer |
| 6a | carbon layer |
| 6b | silver layer |
| 7 | cathode terminal |
| 8 | second resin part |
| 9 | adhesive layer |
| 10 | first resin part |
| 20 | end of anode terminal |
| 50 | exposed face of electrolyte layer |

BEST MODE FOR CARRYING OUT THE INVENTION

Hereinafter, an embodiment of the present invention will be described with reference to the drawings. Note that the present invention is not limited by the embodiment.

EMBODIMENT

Figure 2:
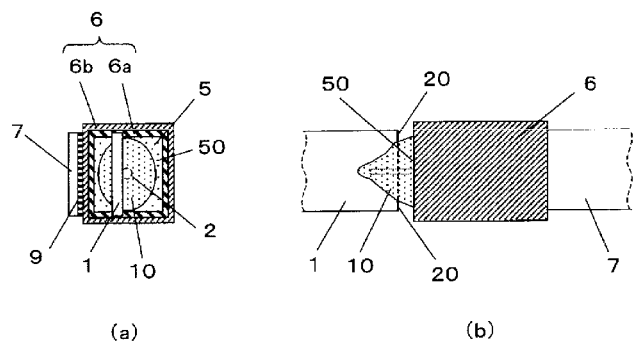
FIG. 2 is views showing necessary parts of the solid electrolytic capacitor according to the embodiment of the present invention before the formation of an outer package, wherein (a) is a side view and (b) is a top view.

FIG. 1 is a cross-sectional view of a solid electrolytic capacitor according to an embodiment of the present invention (after the formation of an outer package). FIG. 2 is views showing necessary parts of the solid electrolytic capacitor according to the embodiment of the present invention before the formation of an outer package, wherein (a) is a side view and (b) is a top view.

As shown in FIGS. 1 and 2, in the solid electrolytic capacitor of the present invention, a dielectric layer 4 made of an oxide is formed to cover the surface of a porous anode body 3 made by forming powder of a valve metal into a green body to embed one end of an anode lead 2 therein and then sintering the green body in a vacuum. An electrolyte layer 5 is formed on the surface of the dielectric layer 4, and a cathode layer 6 composed of a carbon layer 6a and a silver layer 6b is further formed on the surface of the electrolyte layer 5. Apart of the electrolyte layer 5 located around the anode lead 2 does not have the cathode layer 6 formed thereon and is exposed from the cathode layer 6, whereby the anode body has an exposed face 50 of the electrolyte layer 5. In this embodiment, of the outside faces of the anode body 3 in the shape of a rectangular box, the face at which the anode lead 2 is implanted does not have the cathode layer 6 formed thereon, and the face is the exposed face 50 of the electrolyte layer 5 exposed from the cathode layer 6.

The cathode layer 6 is bonded through an adhesive layer 9 to a cathode terminal 7, and the anode lead 2 is welded to the anode terminal 1, whereby they are electrically connected to the terminals 7 and 1. Furthermore, a first resin part 10 is provided to cover a part of the anode lead 2 extending from the exposed face 50 of the electrolyte layer 5 around the anode lead 2 to the anode terminal 1. Thereafter, a second resin part 8 made of an epoxy resin or the like, i.e., an outer package, is formed, thereby obtaining a solid electrolytic capacitor.

As used herein, the anode terminal 1 is an example of an "anode terminal" in the present invention, the anode lead 2 is an example of an "anode lead" in the present invention, the anode body 3 is an example of an "anode" in the present invention, the dielectric layer 4 is an example of a "dielectric layer" in the present invention, the electrolyte layer 5 is an example of an "electrolyte layer" in the present invention, the exposed face 50 of the electrolyte layer is an example of an "exposed face of the electrolyte layer" in the present invention, the cathode layer 6 is an example of a "cathode layer" in the present invention, the cathode terminal 7 is an example of a "cathode terminal" in the present invention, the second resin part 8 is an example of a "second resin part" in the present invention, and the first resin part 10 is an example of a "first resin part" in the present invention.

(Manufacturing Method)

Figure 3:
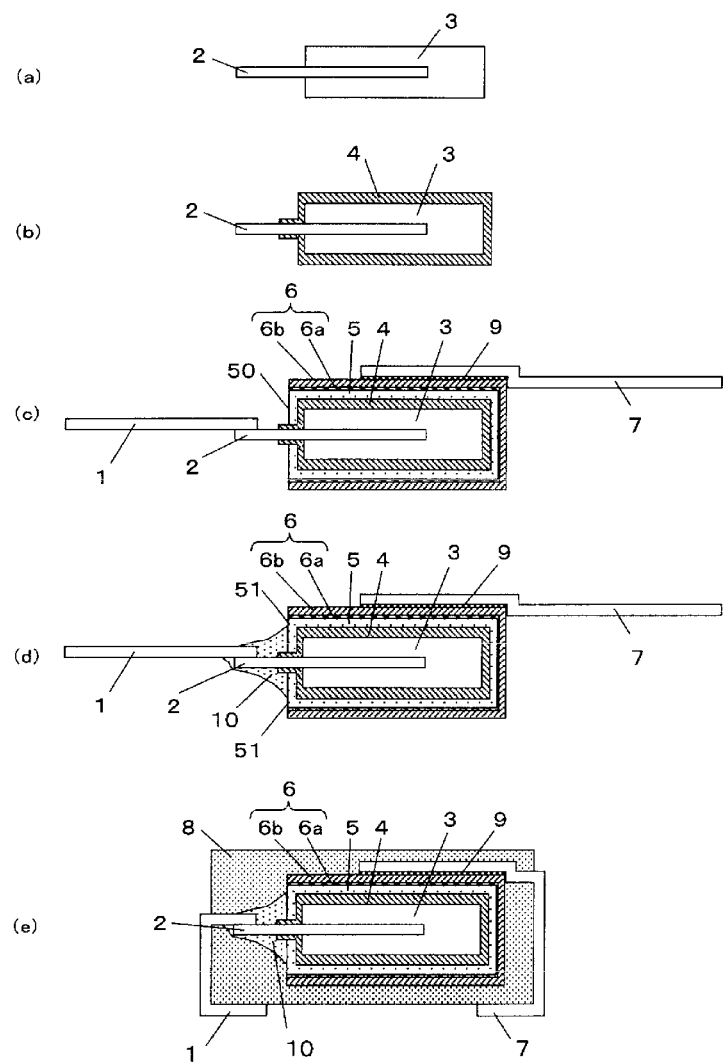
FIG. 3 is views showing manufacturing steps of the solid electrolytic capacitor according to the embodiment of the present invention.

FIG. 3 is views showing manufacturing steps of the solid electrolytic capacitor according to the embodiment of the present invention.

Step 1: As shown in FIG. 3(a), niobium metal powder is used and formed into a green body to embed one end of an anode lead 2 therein, and the green body is sintered in a vacuum to form an anode body 3 consisting of a porous sintered niobium body. Thus, the other end of the anode lead 2 is fixed in extended form from the anode body 3.

Step 2: As shown in FIG. 3(b), the anode body 3 is anodized in a fluorine-containing aqueous solution and then anodized in an aqueous solution of phosphoric acid, thereby forming a dielectric layer 4 made of niobium oxide containing fluorine.

Step 3: As shown in FIG. 3(c), an electrolyte layer 5 is formed, as by chemical polymerization, on the surface of the dielectric layer 4, and thereafter a carbon paste and a silver paste are sequentially applied on the electrolyte layer 5 and dried, thereby forming a cathode layer 6 composed of a carbon layer 6a and a silver layer 6b. At this time, the cathode layer 6 is not formed on the surface of a part of the electrolyte layer 5 located around the anode lead 2, whereby an exposed face 50 of the electrolyte layer 5 exists.

Furthermore, the cathode layer 6 is bonded through an adhesive layer using a conductive material to the cathode terminal 7, and the anode lead 2 is welded to the anode terminal 1, whereby they are electrically connected.

Step 4: As shown in FIG. 3(d), a first resin part 10 made of a silicone resin is provided so that the connecting part between the anode lead 2 and the anode terminal 1 formed in Step 3 and a part of the exposed face 50 of the electrolyte layer 5 are continuously covered.

The first resin part 10 made of a silicone resin formed in this manner is measured for penetration according to JIS K6249. Note that the penetration is a characteristic representing the resin hardness, and the greater its numerical value, the softer the resin.

Step 5: As shown in FIG. 3(e), a second resin part 8, i.e., an outer package, is formed, around the resultant capacitor element formed up to Step 4, by transfer molding using a sealant containing an epoxy resin and an imidazole compound.

Example 1

In Example 1, a solid electrolytic capacitor was produced through steps corresponding to the respective steps (Steps 1 to 5) in the manufacturing method of the above embodiment. Hereinafter, implementation conditions in each step will be described in detail.

Step 1A: As shown in FIG. 3(a), niobium metal powder having a primary particle diameter of approximately 0.5 μm was used and formed into a green body to embed a part of an anode lead 2 therein. The green body was sintered in a vacuum to form an anode body 3 consisting of a porous sintered niobium body with a height of approximately 4.4 mm, a width of approximately 3.3 mm and a depth of approximately 1.0 mm. Thus, the other end of the anode lead 2 was fixed in extended form from the anode body 3.

Step 2A: The anode body 3 was anodized at a constant voltage of approximately 10 V for approximately ten hours in an approximately 0.1% by weight aqueous solution of ammonium fluoride held at approximately 40° C. Then, the anode 3 was anodized at a constant voltage of approximately 10 V for approximately two hours in an approximately 0.5% by weight aqueous solution of phosphoric acid held at approximately 60° C. Thus, a dielectric layer 4 containing fluorine was formed.

Step 3A: An electrolyte layer 5 made of polypyrrole was formed, as by chemical polymerization, on the surface of the dielectric layer 4, and thereafter a carbon paste and a silver paste were sequentially applied on the electrolyte layer 5 and dried, thereby forming a cathode layer 6 composed of a carbon layer 6a and a silver layer 6b. At this time, the cathode layer 6 was not formed on the surface of a part of the electrolyte layer 5 located around the anode lead 2, whereby an exposed face 50 of the electrolyte layer 5 existed.

Furthermore, the cathode layer 6 was bonded through an adhesive layer using a conductive material to the cathode terminal 7, and the anode lead 2 was welded to the anode terminal 1, whereby they were electrically connected.

Step 4A: A first resin part 10 made of silicone resin was provided so that the connecting part between the anode lead 2 and the anode terminal 1 formed in Step 3A and a part of the exposed face 50 of the electrolyte layer 5 were continuously covered. At that time, in the exposed face 50 of the electrolyte layer 5, a non-covered part 51 not covered by the first resin part 10 existed. Note that in this example, as shown in FIG. 1, the first resin part 10 covers a widthwise middle portion of the end 20 of the anode terminal 1 in which the anode lead 2 is located, and the first resin part 10 does not exist on both widthwise end portions of the end 20 of the anode terminal 1.

A description will hereinafter be given of a more specific method for producing the first resin part 10 made of a silicone resin. The silicon resin used was No. TSE3070 manufactured by GE Toshiba Silicones. Specifically, 100 parts by weight of solution of TSE3070 (A) from the above manufacturer was blended with 100 parts by weight of solution of TSE3070 (B) from the same manufacturer, and the solutions were stirred into a uniformly blended resin. Thereafter, the resin was applied with a dispenser to cover desired parts and cured at 70° C. for 30 minutes, thereby forming a first resin part 10 made of the silicone resin.

The first resin part 10 made of the silicone resin formed in this manner was measured for penetration according to JIS K6249. Specifically, the pot of a ¼ mixer was filled with a specimen to be measured, a ¼ cone was dropped into the specimen to read the depth (mm) to which it penetrated thereinto, and the tenfold of the depth (mm) was given as the penetration. As a result, the penetration was 65. Note that the penetration is a characteristic representing the resin hardness, and the greater its numerical value, the softer the resin.

Step 5A: A second resin part 8, i.e., an outer package, was formed, around the resultant capacitor element formed up to Step 4A, by transfer molding using a sealant containing an epoxy resin and an imidazole compound. Specifically, the sealant previously heated at 160° C. was poured into a mold under a pressure of 80 kg/cm$^2$, and cured in the mold under conditions of 160° C. for 90 seconds.

Example 2

Figure 4:
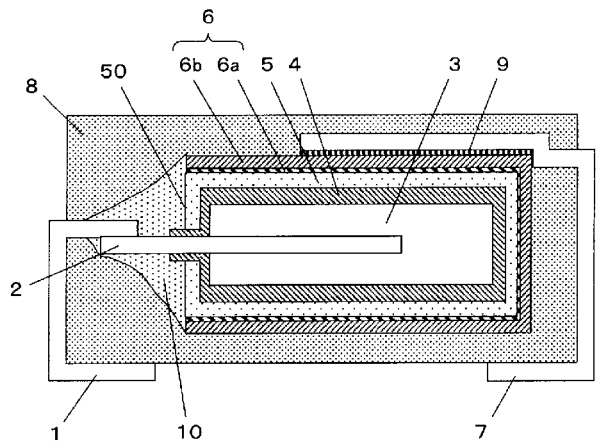
FIG. 4 is a cross-sectional view of a solid electrolytic capacitor according to a second example of the present invention.
Figure 5:
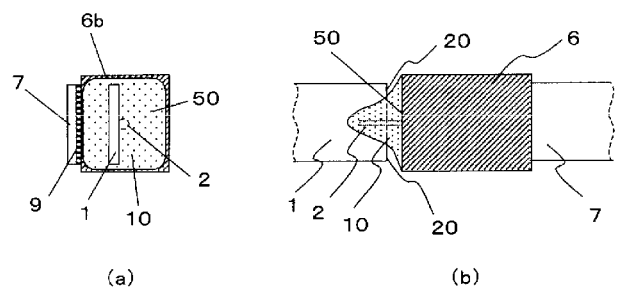
FIG. 5 is views showing necessary parts of the solid electrolytic capacitor according to the second example of the present invention before the formation of an outer package, wherein (a) is a side view and (b) is a top view.

FIG. 4 is a cross-sectional view of a solid electrolytic capacitor according to a second example of the present invention. FIG. 5 is views showing necessary parts of the solid electrolytic capacitor according to the second example of the present invention before the formation of an outer package, wherein (a) is a side view and (b) is a top view.

As shown in FIGS. 4 and 5, in the solid electrolytic capacitor of this example, a solid electrolytic capacitor was produced in the same manner as in Example 1 except that in Step 4A in Example 1, a first resin part 10 was provided to cover not a part of the exposed face 50 of the electrolyte layer 5 but the entire exposed face 50. Specifically, in this example, in the exposed face 50 of the electrolyte layer 5, no non-covered part 51 not covered by the first resin part 10 existed.

Example 3

Figure 6:
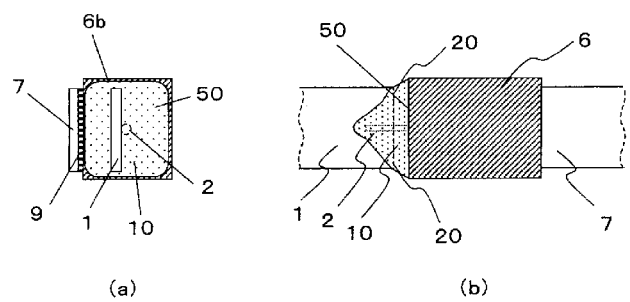
FIG. 6 is views showing necessary parts of a solid electrolytic capacitor according to a third example of the present invention before the formation of an outer package, wherein (a) is a side view and (b) is a top view.

FIG. 6 is views showing necessary parts of a solid electrolytic capacitor according to a third example of the present invention before the formation of an outer package, wherein (a) is a side view and (b) is a top view.

As shown in FIG. 6, in the solid electrolytic capacitor of this example, in Step 4A in Example 1, a first resin part 10 was provided like Example 2 to cover not a part of the exposed face 50 of the electrolyte layer 5 but the entire exposed face 50, and the first resin part 10 was provided to cover the end 20 of the anode terminal 1 throughout the entire width at the connecting part between the anode lead 2 and the anode terminal 1. In other respects, the solid electrolytic capacitor was produced in the same manner as in Example 1.

Comparative Example 1

Figure 7:
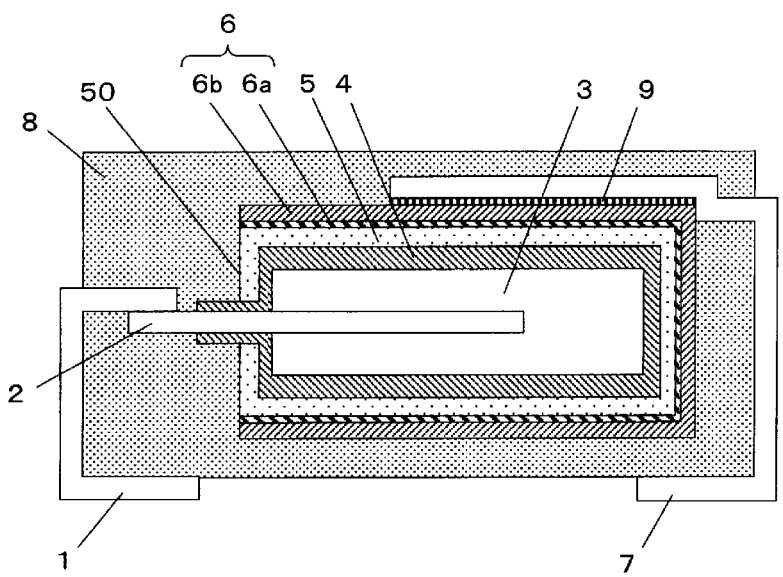
FIG. 7 is a cross-sectional view of a solid electrolytic capacitor according to Comparative Example 1.

FIG. 7 is a cross-sectional view of a solid electrolytic capacitor according to Comparative Example 1.

In this comparative example, a solid electrolytic capacitor was produced in the same manner as in Example 1 except that in Example 1, Step 4A was not performed.

Comparative Example 2

Figure 8:
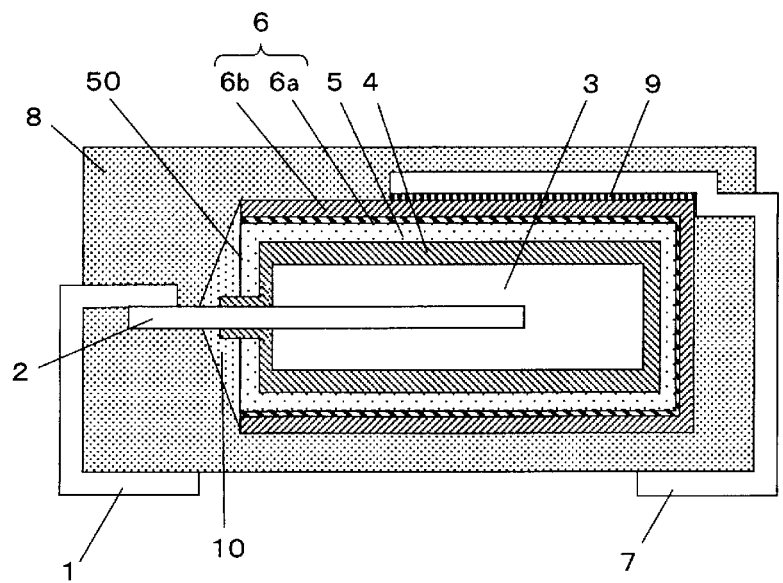
FIG. 8 is a cross-sectional view of a solid electrolytic capacitor according to Comparative Example 2.

FIG. 8 is a cross-sectional view of a solid electrolytic capacitor according to Comparative Example 2.

In this comparative example, a solid electrolytic capacitor was produced in the same manner as in Example 1 except that in Step 4A in Example 1, a first resin part 10 was not provided at the connecting part between the anode lead and the anode terminal but was provided to cover the entire exposed face 50 of the electrolyte layer 5.

(Measurement of Leakage Current)

A voltage of 2.5 V was applied across both the terminals of each of the solid electrolytic capacitors, and the current flowing across the terminals 20 seconds after the voltage application was measured as a leakage current.

TABLE 1 shows the results of leakage current measurement. Note that the values of leakage current are indicated in relative values when the value of leakage current in Example 1 is taken as 100.

TABLE 1

|  | Leakage Current (Relative Value) |
| --- | --- |
| Example 1 | 100 |
| Example 2 | 88 |
| Example 3 | 80 |
| Comparative Example 1 | 1230 |
| Comparative Example 2 | 640 |

TABLE 1 shows that the solid electrolytic capacitors of Examples 1 to 3 can reduce the leakage current to 1/10 or less of that of Comparative Example 1 in which no first resin part 10 is provided. Furthermore, TABLE 1 shows that the solid electrolytic capacitors of Examples 1 to 3 can significantly reduce the leakage current as compared to Comparative Example 2 in which the first resin part 10 is not provided at the connecting part between the anode lead 2 and the anode terminal 1.

It can be assumed that the reason for this is that the resin injection pressure during formation of the outer package can be distributed to the first resin part and the anode lead, whereby the stress transmitted through the anode lead to the interior of the anode body can be relaxed.

In addition, TABLE 1 shows that Example 2 in which the first resin part 10 is provided on the entire exposed face 50 of the electrolyte layer 5 can reduce the leakage current more than Example 1. It can be assumed that the reason for this is that the resin injection pressure can be relaxed over the entire exposed part of the electrolyte layer 5 by the first resin part 10, whereby the stress applied through the electrolyte layer 5 to the anode body 3 can be reduced.

Furthermore, according to Example 3 having a structure in which the end 20 of the anode terminal 1 is fully covered with the first resin part 10, the leakage current can be further reduced. It can be assumed that the reason for this is that since the end 20 of the anode terminal 1 is covered throughout the entire width by the first resin part 10, the flow of resin during transfer molding for the formation of the outer package does not form any unnecessary flow coming into direct contact with the widthwise end portions of the end 20 of the anode terminal 1 and neighboring portions and coming around them, whereby the resin pressure on the connecting part between the anode lead 2 and the anode terminal 1 is relaxed.

Examples 4 to 6

Solid electrolytic capacitors according to Examples 4 to 6 were produced in the same manner as in Examples 1 to 3 except that in Step 4A, a first resin part 10 made of an epoxy resin was formed instead of a first resin part 10 made of a silicone resin. Specifically, Examples 4, 5 and 6 correspond to Examples 1, 2 and 3, respectively, in relation to the location of the first resin part 10. In these cases, the epoxy resin used for the epoxy resin-made first resin part 10 was No. ZC-203T manufactured by Nippon Pelnox Corporation. The resin was applied with a dispenser to cover desired parts and cured at 100° C. for 30 minutes, thereby forming a first resin part 10.

Comparative Example 3

In this comparative example, a solid electrolytic capacitor according to Comparative Example 3 was produced in the same manner as in Comparative Example 2 except that in Comparative Example 2, a first resin part 10 made of an epoxy resin was formed instead of a first resin part 10 made of a silicone resin.

TABLE 2 shows the results of leakage current measurement. Note that the values of leakage current are indicated in relative values when the value of leakage current in Example 1 is taken as 100.

TABLE 2

|  | Leakage Current (Relative Value) |
| --- | --- |
| Example 4 | 190 |
| Example 5 | 164 |
| Example 6 | 156 |
| Comparative Example 3 | 974 |

TABLE 2 shows that also in the cases where a first resin part 10 made of an epoxy resin is formed, the leakage current is significantly reduced as compared to Comparative Example 3. On the other hand, a comparison of Examples 1 to 3 with Examples 4 to 6 shows that silicone resin is preferred as a type of resin used for the first resin part 10.

Next shown are examples varied in penetration of silicone resin used for the first resin part 10 (Examples 7 to 15). Note that in these examples, the structure of Example 3 was employed.

Examples 7 to 15

Solid electrolytic capacitors were produced in the same manner as in Example 3 except that in Step 4A in Example 3, respective silicone resins having different penetrations of 15, 30, 40, 90, 110, 150, 180, 200 and 220 were used. The implementation of silicone resins having different penetrations can be controlled by the blending ratio of solution of TSE3070 (B) to 100 parts by weight of solution of TSE3070 (A). Specifically, the silicone resins having the above penetrations can be obtained by setting their blending ratios of solution of TSE3070(B) to 100 parts by weight of solution of TSE3070 (A) at 130, 120, 110, 95, 90, 85, 80, 75 and 70 parts be weight.

TABLE 3 shows the results of leakage current measurement. Note that the values of leakage current are indicated in relative values when the value of leakage current in Example 1 is taken as 100.

TABLE 3

| | Blending Ratio (Parts by Weight) | | | Leakage Current |
|---|---|---|---|---|
| | A | B | Penetration | (Relative Value) |
| Example 7 | 100 | 130 | 15 | 124 |
| Example 8 | 100 | 120 | 30 | 97 |
| Example 9 | 100 | 110 | 40 | 85 |
| Example 3 | 100 | 100 | 65 | 80 |
| Example 10 | 100 | 95 | 90 | 82 |
| Example 11 | 100 | 90 | 110 | 85 |
| Example 12 | 100 | 85 | 150 | 90 |
| Example 13 | 100 | 80 | 180 | 96 |
| Example 14 | 100 | 75 | 200 | 100 |
| Example 15 | 100 | 70 | 220 | 128 |

TABLE 3 shows that all of these examples indicate low leakage current values, and that when the penetration of silicone resin used for the first resin part 10 is within the range from 30 to 200, the leakage current is significantly low as compared to when the penetration is out of the range. In addition, the leakage current is still lower within the penetration range from 40 to 150, which is a preferred range.

INDUSTRIAL APPLICABILITY

As can be seen from the above description, the solid electrolytic capacitor according to the present invention can reduce the leakage current, and is therefore also applicable to applications including personal computers and game consoles.

The invention claimed is:

1. A solid electrolytic capacitor comprising a capacitor element including:
an anode composed of a sintered body of metal particles;
an anode lead provided so that one end thereof is embedded in the anode;
a dielectric layer formed on the surface of the anode;
an electrolyte layer formed on the dielectric layer; and
a cathode layer formed on the electrolyte layer so that an exposed face of the electrolyte layer exists around the anode lead, wherein
an anode terminal electrically connected to the other end of the anode lead by welding directly in contact with the other end of the anode lead and a cathode terminal electrically connected to the cathode layer are attached to the capacitor element, and
a first resin part having a substantially conical shape with a vertex located at the side of the other end of the anode lead is provided to cover a part of the anode lead extending from the exposed face of the electrolyte layer of the capacitor element to the anode terminal and the welded parts of the anode lead and the anode terminal, and a second resin part is provided to cover at least the capacitor element and the first resin part.

2. The solid electrolytic capacitor according to claim 1, wherein the first resin part is provided to cover the entire exposed face of the electrolyte layer.

3. The solid electrolytic capacitor according to claim 1, wherein a silicone resin is used as the first resin part.

4. The solid electrolytic capacitor according to claim 3, wherein the penetration of the silicone measured according to JIS K6249 is within the range from 30 to 200.

5. The solid electrolytic capacitor according to claim 1, wherein the cathode layer is covered with the second resin part and not with the first resin part.

6. A method for manufacturing a solid electrolytic capacitor, comprising the steps of:
forming a capacitor element by forming an anode lead to embed one end thereof in an anode made of a sintered body of metal particles, forming a dielectric layer on the surface of the anode, forming an electrolyte layer on the dielectric layer and forming a cathode layer on the electrolyte layer to expose a part of the electrolyte layer located around the anode lead;
electrically connecting the other end of the anode lead to an anode terminal by welding so that the anode terminal is directly in contact with the other end of the anode lead;
electrically connecting the cathode layer to a cathode terminal;
after the step of electrically connecting the other end of the anode lead to the anode terminal, forming a first resin part having a substantially conical shape with a vertex located at the side of the other end of the anode lead to cover a part of the anode lead extending from the exposed face of the electrolyte layer of the capacitor element to the anode terminal; and
forming a second resin part to cover at least the capacitor element and the first resin part.

7. The method for manufacturing a solid electrolytic capacitor according to claim 6, wherein the cathode layer is covered with the second resin part and not with the first resin part.

* * * * *